United States Patent [19]

Outubuddin

[11] Patent Number: 5,238,992
[45] Date of Patent: Aug. 24, 1993

[54] MICROEMULSION POLYMER BLENDS

[75] Inventor: Syed Outubuddin, Euclid, Ohio

[73] Assignee: Edison Polymer Innovation Corporation, Brecksville, Ohio

[21] Appl. No.: 935,645

[22] Filed: Aug. 26, 1992

Related U.S. Application Data

[63] Continuation of Ser. No. 673,257, Mar. 20, 1991, abandoned, which is a continuation of Ser. No. 400,340, Aug. 30, 1989, abandoned.

[51] Int. Cl.$^5$ ............................................. C08K 5/521
[52] U.S. Cl. ................................. 524/710; 524/714; 524/719; 524/720; 524/723; 524/724; 524/735; 524/740; 524/745; 524/747; 524/752; 524/755; 524/759; 524/765; 524/770; 524/796
[58] Field of Search ............... 524/710, 714, 720, 724, 524/742, 747, 748, 750, 755, 759, 760, 761, 762, 774, 796, 719, 723, 735, 740, 745, 747, 752, 765, 770

[56] References Cited

U.S. PATENT DOCUMENTS

| | | | |
|---|---|---|---|
| 3,243,419 | 3/1966 | Ingram | 526/201 |
| 3,389,110 | 6/1968 | Taft | 525/296 |
| 3,616,166 | 10/1971 | Kelley | 525/218 |
| 3,814,742 | 6/1974 | Nagy | 525/296 |
| 3,816,170 | 6/1974 | Mudde | 428/522 |
| 3,862,077 | 1/1975 | Schultz et al. | 524/417 |
| 3,883,617 | 5/1975 | Krieg et al. | 525/296 |
| 3,914,338 | 10/1975 | Krieg et al. | 525/296 |
| 3,996,180 | 12/1976 | Kane | 524/801 |
| 4,485,209 | 11/1984 | Fan et al. | 524/801 |
| 4,521,317 | 6/1985 | Candau et al. | 252/8.55 D |
| 4,521,580 | 6/1985 | Turner et al. | 526/307.2 |
| 4,528,348 | 7/1985 | Turner et al. | 526/225 |
| 4,708,981 | 11/1987 | Zupancic et al. | 525/59 |
| 4,739,008 | 4/1988 | Robinson et al. | 524/801 |

OTHER PUBLICATIONS

"Preparation and Characterization of Porous Polymers from Microemulsions", ACS Symposium Series 384, 1989.
*Hawley's Condensed Chemical Dictionary*, edited by Sax et al., Van Nostrand Reinhold, New York, 1987, pp. 477, 774, 1223 and 1224.
"Novel Polymeric Materials from Microemulsion", Journal of Polymer Science Part C: Polymer Letters, vol. 26, 429-432 (1988).
"Microemulsion Polymerization", Encyclopedia of Polymer Science and Engineering, vol. 9, 2nd Edition.
"Microemulsions", Chemical Engineering, pp. 51-59, 1985.

*Primary Examiner*—Joseph L. Schofer
*Assistant Examiner*—R. H. Delmendo
*Attorney, Agent, or Firm*—Louis J. Weisz

[57] ABSTRACT

A process for preparing solid polymer blends and composites of controlled porosity in microemulsions containing both hydrophilic and hydrophobic phases. The microemulsions are prepared with surfactant systems that may include a cosolvent as a part thereof, together with a hydrophilic monomer, or monomers, dissolved in the hydrophilic phase of the microemulsion, and a hydrophobic monomer, or monomers, dissolved in the hydrophobic phase. Polymerization of the monomers thus present is carried out to provide highly uniform dispersions of the resulting polymers in each other. The invention allows for the control of the morphology of the blends, the improvement in compatability of otherwise incompatible polymers, and improvements in the processability of the polymers due to enhanced thermal and mechanical properties.

8 Claims, No Drawings

1

MICROEMULSION POLYMER BLENDS

This is a continuation of co-pending application Ser. No. 07/673,257 filed on Mar. 20, 1991, now abandoned, which is a continuation of 07/400,340 filed on Aug. 30, 1989, now abandoned.

TECHNICAL FIELD

This invention relates to polymerization processes carried out in microemulsion reaction mixtures. More particularly, this invention relates to the preparation of polymer blends exhibiting a high degree of homogeneity. Specifically this invention concerns the formation of microemulsions in which hydrophobic monomers and hydrophilic monomers are combined together in reaction mixtures as microemulsions and subsequently polymerized to provide a blend of polymers in which each of the polymers is uniformly dispersed throughout the blend.

BACKGROUND OF THE INVENTION

While an almost endless variety of polymers are known which display a correspondingly broad range of properties, applications are frequently encountered requiring properties not to be found in available polymers. Furthermore, even when polymers with suitable properties are known, they are oftentimes unavailable commercially because of their cost, or due to the fact that the raw materials required to make them are relatively unavailable.

For the preceding and other reasons, therefore, it is frequently desirable to prepare blends from polymers having individual properties that contribute to the polymer combination so as to produce a composition possessing a wide variety of useful physical and chemical characteristics.

While theoretical combinations of polymers displaying required properties are frequently readily conceived, a satisfactory physical joinder of such polymers is sometimes hard to achieve. In this regard, the blending of desirable polymers is commonly attempted by mechanical mixing, or by casting mixtures of polymer solutions. Unfortunately, however, high viscosities of the polymers quite often make their intimate mixing in the form of homogeneous blends difficult.

Furthermore, while the polymeric constituents of some polymer mixtures are relatively compatible in the sense that they show partial miscibility and are relatively easy to combine, others are very immiscible with each other. These latter possess high interfacial tension and often low interfacial adhesion. Such polymers are not only hard to mix because of the magnitude of the internal interfacial tension, but since the transfer of mechanical stress is dependent upon the degree of interfacial adhesion, polymer blends deficient in interfacial adhesion demonstrate poor physical properties, including low tensile strengths, as well as a high order of brittleness. In addition, such blends have a tendency to stratify into gross domains during blending, or during subsequent processing, further impairing their physical properties.

In the past, attempts to circumvent the problems associated with the immiscibility of polymers which it is desired to blend have included the incorporation of copolymers, particularly block copolymers, having separate portions which possess affinities, respectively, for the different polymers making up the blends being prepared. While the technique is often successfully used, it unfortunately entails the expense of providing an additional polymer which usually makes no contribution to the blend other than to preserve its integrity, and in the case of blends fabricated by mechanical means, its efficiency also depends on its own uniform dispersion throughout the blended system.

BRIEF DESCRIPTION OF THE INVENTION

In view of the preceding, therefore, it is a first aspect of this invention to provide polymer blends and composites, both of which are referred to herein as "blends", from even substantially immiscible polymers.

A second aspect of this invention is to provide blends of hydrophilic polymers with hydrophobic polymers.

Another aspect of this invention is to furnish blends of polymers displaying superior homogeneity.

A further aspect of this invention is to provide porous blends of polymeric materials.

An additional aspect of this invention is to make available blends of polymers whose solid phases do not stratify during blending or subsequent processing.

Yet another aspect of this invention is to provide polymer blends without the use of polymeric compatibilizing agents.

A still further aspect of this invention is to furnish blends of polymers with reduced interfacial tension and improved interfacial adhesion.

An added aspect of this invention is to provide a process for fabricating polymers with desirable glass transition temperatures.

A further aspect of this invention is to produce novel interpenetrating polymeric network systems, as well as self-reinforcing polymer composites.

An additional aspect of this invention is to provide polymeric material with enhanced mechanical and thermal properties.

The preceding and additional aspects of this invention are provided by a process for preparing blends and composites of solid polymers from microemulsions comprising the steps of (1) forming a reaction mixture by combining components that include:
 a polar reaction medium;
 at least one emulsifier soluble in another component of said reaction mixture;
 at least one hydrophilic monomer soluble in said medium; and
 at least one hydrophobic monomer;
(2) agitating said mixture until the formation of a microemulsion has been achieved, and (3) polymerizing said monomers, thereby producing a solid polymeric blend.

The foregoing and other aspects of this invention are provided by polymer blends and composites prepared according to the process of the preceding paragraph.

The preceding and further aspects of this invention are provided by a process for preparing blends and composites of solid polymers from microemulsions comprising the steps of forming a reaction mixture by preparing a microemulsion from components that include:
 water;
 at least one emulsifier soluble in water;
 a member of the group of acrylamide, bisacrylamide and mixtures thereof; and
 a member of the group of styrene, divinylbenzene, and mixtures thereof,
and polymerizing the latter two components of said mixture.

The foregoing and still other aspects of this invention are provided by polymer blends and composites prepared according to the process of the preceding paragraph.

DETAILED DESCRIPTION OF THE INVENTION

Microemulsions are isotropic dispersions of immiscible fluids, generally oil and water, thermodynamically stabilized by the presence of surfactant molecules arranged in a microstructure at the interface of the fluids. Thermodynamically stable microemulsion systems will form spontaneously if the interfacial tension between the phases is low enough so that the increase in interfacial free energy due to the dispersion of one phase in the other is less than the free energy decrease due to the entropy of the dispersion. Microemulsions are to be found comprising three general types including (1) those involving a polar substance such as water as the continuous phase, with an oily phase in the form of droplets suspended therein, referred as a "oil-in-water type", or a lower phase; (2) those in which the polar phase is suspended as droplets in the oily phase, a "water-in-oil type", or an upper phase; and (3) a "bicontinuous type", involving an interpenetrating, connected network of oily and polar domains, or a middle phase.

Microemulsions are characterized by having much smaller droplets, or domain sizes than ordinary emulsions. In the case of microemulsions, for example, the droplets or domains will be in the order of from about 0.01 to 0.1 microns, while in the case of ordinary emulsions, the particle size will be greater than 0.1 microns, typically from about 1 to 10 microns. In addition to the difference in size, microemulsions are stable structures, which resist gross segregation, while ordinary emulsions tend to separate with time.

As disclosed herein, microemulsions have been found to possess the capability of achieving superior polymer blends since in the fluid state the interfacial tension is one of the most important factors in determining the extent of dispersion during mixing, while in the solid state, interfacial adhesion governs the transfer of mechanical stresses between the phases. While monomeric materials with low affinity for each other display high interfacial tensions and correspondingly low interfacial adhesion when polymerized to a solid state, the surfactants in microemulsions containing incompatible monomers have been found to greatly lower the interfacial tension between the phases, and to produce a highly dispersed polymer blend with superior interfacial adhesion. The concept of the invention, in effect, is one involving the use of the surfactants of the microemulsions as "compatibilizing agents" to obtain microblends which possess improved physical properties.

The process of the invention, therefore, comprehends the formation of microemulsions in which hydrophobic monomers are combined with hydrophilic monomers, in the presence of surfactant systems, and the monomers polymerized to produce the desired blends of solid polymers.

While the factors that facilitate the formation of microemulsions are generally understood by those skilled in the art, the formation of a particular combination of monomers in an microemulsion generally must be established somewhat empirically, prior to the actual polymerization.

While other procedures may be employed, in the case of water-in-oil microemulsions, the surfactant is usually added to the oil prior to addition of the other phase. In those instances where an oil-in-water microemulsion is desired, the surfactant will typically be mixed with the water prior to addition of the other phase. In the case of bicontinuous systems either procedure may be used.

Thereafter, the components are mixed, for example, by means of an ultrasonic agitator device, and then allowed to remain undisturbed, sometimes at the temperature at which the polymerization is subsequently to be conducted, for a period of from 1 to 2 days, during which time the mixture equilibriates. Formation of a microemulsion is confirmed by the creation of a transparent or translucent mixture, somewhat bluish in color, while the formation of a milky white unstable emulsion or viscous gel indicates that a microemulsion has not been achieved. Other methods of confirming formation of the desired microemulsion include light scattering techniques using laser light, as well as other known techniques. The absence of changes in appearance, or in the volume of the microemulsion phase after a week is reasonably conclusive evidence that the system selected is adapted to the formation of a microemulsion.

As a general rule, it may be stated that the morphology of the microemulsion, and therefore the characteristics of the blend obtained, depend upon such factors as the type of surfactants used, and the ratio of monomers present, as well as other influences hereinafter described. Depending upon the specific use contemplated for the resulting polymer blend, the microemulsion will be prepared as an oil-in-water mixture, a water-and-oil mixture, or a bicontinuous mixture, and while microemulsions are capable of spontaneous formation, agitation greatly accelerates their formation.

In addition to providing superior dispersions, it has been found possible to vary the glass transition temperature, or temperatures of the polymer mixture produced. In this regard, the appropriate choice of surfactants and combinations thereof can often be used to desirably modify the glass transition temperature, or temperatures of the blends. On the other hand, when a nonionic surfactant is employed, the glass transition temperature is frequently lowered, a phenomonen that can be of value in certain applications.

While polymerizations have been conducted employing microemulsions in the past, the invention described herein is unique in employing two monomers simultaneously, one hydrophobic and one hydrophilic, and in yielding a solid polymeric blend, as opposed to a film forming latex, the type of product with which the prior art has been concerned.

The prediction of the most suitable emulsifiers and oils for the production of microemulsions is facilitated through the use of the so-called Griffin hydrophile-lipophile balance, HLB. The Balance, which indicates how hydrophilic or hydrophobic a surfactant is, can also be a predictor of which of the microemulsion types is most likely to be formed. The Balance range usually varies from about 1 to about 40, and in cases where an oil-in-water microemulsion is desired, a higher value is sought, while a lower number is employed in the case of a water-in-oil mixture. A midrange HLB value of the system favors formation of a bicontinuous microemulsion.

A wide variety of surfactants may be employed for the purposes of the invention, including those of the anionic, cationic, and nonionic variety. Mixtures of the same type, or of several types of surfactants may also be employed, depending upon the nature of the polymer desired. As previously described, the nature of the surfactant is to reduce the interfacial tension between the liquid phases and to increase interfacial adhesion between the solid polymer phases. Surfactants, including straight and branched chain molecules, such as anionic surfactants including alkyl benzene sulfonates, alcohol sulfates, alcohol ether sulfates, alkyl phenol ether sulfates, fatty amide ether sulfates, alpha-olefin sulfates, paraffin (alkane) sulfonates, alpha-sulfonated fatty acids and esters, sulfonated fatty acids and esters, mono - and di-ester sulfosuccinates, sulfosuccinates, petroleum sulfonates, phosphate esters, and ligno sulfonates; nonionic surfactants including alkyl phenol ethoxylates, fatty alcohol ethoxylates, ethylene oxide-propylene oxide co-polymers, fatty amine ethoxylates, fatty acid ethoxylates, fatty acid ethylene oxide/propylene oxide co-polymers, alkanolamides and ethoxylates, and sorbitan esters and ethoxylates; and cationic surfactants including primary alkylamines, quaternary ammonium salts, and imidazolinium salts; and amphoteric surfactants, including betaines, sulfo-betaines, and imidazolines are all suitable. Surfactants are characterized by having polar "heads", and aliphatic "tails", and the presence of multiple tails, or high molecular weight tails favors the formation of water-in-oil microemulsions, whereas strongly polar heads, and multiple heads facilitate the formation of oil-in-water mixtures.

In regard to the foregoing, the glass transition temperature, $T_g$, is normally increased by the use of anionic surfactants in the microemulsion systems. In the presence of a polar material such as water, the surfactant disassociates and apparently interacts strongly with the "pi" electrons of the hydrophobic polymer. This results in decreased segmental mobility, that is, increased chain stiffness and a reduction in the effective free volume of the system, thus promoting an increase in the $T_g$. The chain stiffness evidently also leads to increased physical cross-linking. In the case of the nonionic systems, decreases in $T_g$ may be due to the absence of electrostatic interaction between the surfactant and the hydrophobic polymer. In such instances, the nonionic surfactant may behave as a low molecular additive, such as plasticizer, increasing segmental mobility.

Among examples of suitable anionic surfactants may be mentioned sodium akyl sulfates, e.g., sodium dodecyl sulfate (SDS), sodium-di-2-ethylhexylsulfosuccinate, sold under the trademark "Aerosol OT" (ACT), sodium dodecyl benzene sulfonate, potassium oleate, and sodium didodecylbenzene sulfonate; illustrative cationic surfactants comprise alkyl (e.g. cetyl) trimethylammonium bromide, alkylammonium halides (e.g. dodecyl ammonium chloride), n-alkyl pyridinium bromide (e.g. dodecyl pyridinium bromide); and representative non-ionic surfactants include ethoxylated dinonyl phenol, such as that sold under the trademark "Trycol DNP-8", polyoxyethylene sorbitan monostearate sold under the trademark "Tween 60", polyoxyethylene (20) sorbitan monoleate, e.g. including that marketed under the trademark "Emsorb 6900", polyoxyethylene (4) lauryl alcohol such as that sold under the trademark "Emthox 5882", polyethylene glycol ether of secondary alcohol including that marketed under the trademark "Tergitol 15-S-15, and ethoxylated alcohols such as those sold under the trademarks Neodol 91-2.5 and 23-3. Amphoteric/zwitterionic surfactants, also suitable include, for example, such materials as octadecyl dimethyl betaine ($C_{18}$ DMB) and others.

In addition to the preceding, many other similar surfactants are also suitable, as are mixtures of them. Mixtures of emulsifiers also provide a convenient way in which the HLB value may be adjusted.

The formation of microemulsions is promoted by the presence of relatively high concentrations of surfactant, compared to ordinary macroemulsions. In this regard, concentrations of from about 2% to about 15%, or even higher, by weight, based on the weight of the microemulsion are suitable for purposes of the invention.

In addition to the surfactant, the use of a cosolvent is commonly of benefit in the formation of the microemulsion systems. While cosolvent are usually not required with nonionic surfactants, they are often employed with those of the ionic type. While not wishing to be bound by the theory, it is believed that in the case of the ionic surfactants, the interfacial film is more rigid, and thus has more difficulty in forming highly curved phase domains. The cosolvent incorporates with the surfactant and is believed to facilitate conformation of the surfactant to the perimeters of the domains.

Many different materials are capable of serving as cosolvent, for example, short chain alcohols such as propanol, butanol, hexanol, heptanol, pentanol, and octanol, certain ethers, for instance, ethylene glycol monobutyl ether, short chain amines, short chain ketones, and the like.

While the concept of the invention envisions the combination of a hydrophobic monomer with a hydrophilic monomer in the presence of the surfactant system, the hydrophilic monomer is normally a solid, rather than a liquid. Consequently, in instances where the hydrophilic monomer is a solid, it is necessary to dissolve the hydrophilic monomer in a polar material such as water, formamide, methanol, or some similar substance. However, an aqueous medium is utilized in the preferred embodiment of the invention.

Beyond making it possible to dissolve the hydrophilic monomer, due to its subsequent evaporation following polymerization, the water or other polar substance also provides a method for introducing porosity into the structure of the hydrophilic polymer. Since the latter is uniformly dispersed throughout the polymer blend, as a practical matter the blend as a whole exhibits porosity, a characteristic which in some applications provides significant benefits. In this regard, it is also possible to introduce porosity into the hydrophobic polymer phase simply by incorporating, and subsequently evaporating, non-polymerizable organic solvents in the reaction mixture.

The pore morphology, may be determined by scanning electron microscopy, and is dependant upon the initial microstructure of the microemulsion, as determined by factors such as the type of surfactant and cosolvent, in addition to the monomer composition and polymerization conditions.

The polymerized blend shows pores in both the micron and sub-micron ranges, and normally displays greater porosity when the microemulsion is of the bicontinuous type in contrast to either the oil-in-water type, or the water-in-oil type. The greater porosity obtained from the bicontinuous type appears to be due to the fact that such microemulsion contains interconnected domains of both water-continuous and oil-continuous regions. The porosity can, therefore, be controlled by adjusting such factors, and by adjusting the amount of water or other polar medium present. Sufficient water should be present, however, to solubilize the hydrophilic monomer, with more than that amount sometimes being needed to avoid phase separation. The exact amount of water required is readily determined by experimentation, and will typically vary with the nature of the system present.

Other factors that affect the phase behavior of microemulsions include the salinity of the system, its hydrogen ion concentration, pH, the reaction temperature, and the pressure employed for the reaction. Generally, salinity can provide a means for adjusting the type of microemulsion formed. In this regard, as the salinity increases, there is a steady progression from the lower phase type, to the middle phase, to the upper phase type microemulsions. The salinity provides a useful tool, therefore, to manipulate the microstructure. While sodium chloride is frequently employed, other salts will exhibit similar effects.

If desired, the effect of salinity on the phase behavior can be counterbalanced, or reinforced, by adjustment of the pH of an appropriate microemulsion. In the case of carboxylic acids, amines, and other pH-sensitive surfactants, as the pH rises, there is a transition from the upper, to the middle, to the lower-type phases. The effect is also evident in the case of zwitterionic type surfactants, i.e., those carrying a positive and a negative charge on the same surfactant.

Various monomer and polymer components may be employed in preparing the polymeric blends of the invention, for example, a single hydrophilic monomer can be polymerized with a single hydrophobic monomer. Alternatively, multiple monomers can be present in the same phase, if desired of a kind capable of producing copolymers or terpolymers in the microemulsion systems, thus leading to more complex blends of products. By way of illustration, when styrene is present, it may be copolymerized with divinyl benzene, vinyl toluene, n-vinylcarbazole, benzyl acrylate, benzyl methacrylate, as well as additional compounds.

Among suitable hydrophobic monomers may be mentioned styrene, and other monomers including a vinyl group, such as, for example, acrylates, including methylacrylate, methyl methacrylate, ethylacrylate, butylacrylate, vinyl acetate, vinyl chloride, ethyl vinyl ether, as well as unsaturated esters, and others.

In the case of hydrophilic monomers, components such as acrylamide; acrylic acid; methacrylic acid; acrylonitrile; vinyl methyl ether; N-vinyl pyrrolidone; 4-vinyl pyridine; 3-methacrylamidopropyldimethylamine; N,N'-dimethylaminoethylmethacrylate, and others.

The ratio of monomers utilized, i.e., the ratio of hydrophilic to hydrophobic monomers, will depend upon the properties required in the polymeric product. The surfactant type and concentration can also be manipulated to obtain desirable properties.

In carrying out the polymerization, any of the well-known polymerization techniques may be employed, for instance, thermal polymerizations; those involving actinic radiation, including UV radiation; high energy beam radiation, and similar techniques.

In cases where thermal polymerizations are employed, suitable initiators are added to the reaction mixture, including such compounds as potassium persulfate ($K_2 S_2 O_8$); azobisisobutyronitrile (AIBN), benzoyl peroxide, hydrogen peroxide, and others.

The concentration of the initiator will depend upon the type used, and the nature and amounts of monomer, or monomers present; however, commonly the initiator will amount to from about $\frac{1}{2}\%$ to about 3% by weight of the monomer present. In such cases it is desirable to provide an initiator, or mixture of initiators such that an initiator is present in both the hydrophilic and hydrophobic phases.

In conducting the polymerization, a typical procedure involves the preparation of aqueous solutions of surfactant, cosolvent if any, water, and hydrophilic monomer, or monomers. Finally, the hydrophobic monomer, or monomers, is added. Alternatively, an organic solution of surfactant, the hydrophobic monomer, and any organic solvent present is prepared. Thereafter, the aqueous solution of the hydrophilic monomer, or monomers, is added.

The solutions are subsequently gently heated to the polymerization temperature and mixed, for example, by first employing a vortex mixture, and then by ultrasonication. Following mixing, the reaction mixture is equilibrated at a constant temperature, and the phase behavior of the system is observed, for example, by a polarized light screen. Equilibrium is assumed to have been achieved when the volumes and appearance of the phases do not show signs of change with time. Equilibration sometimes requires from 1 to 3 days for anionic surfactant systems, and can require up to 3 to 4 weeks for some nonionic systems.

Polymerization is subsequently initiated, for example, by the addition and thermal decomposition of a suitable initiator for a period long enough to complete the polymerization reaction. The use of a nitrogen blanket during the polymerizations is advantageously employed to prevent premature termination of polymer chains due to interaction of oxygen in the air with the initiator-driven reactions.

The temperature of the polymerization will depend upon the nature of the polymerization system, a temperature range from about 10° C. to about 100° C. commonly being used.

The time of the polymerization will be dependant upon the nature of, and the relative amounts of the reaction components present, and may range from a matter of minutes to a number of days. Usually, however, the reaction requires only a few hours to complete.

On a macro scale, the polymeric product, particularly that produced with ionic surfactants, will normally appear to be a single phase, confirming the high degree of homogeneity possible. Usually only when viewed under suitable magnification does the two-phase microstructure of the product becomes evident.

The processes of the invention can be successfully used to alter the morphology of the product composites and blends produced by controlling the domain sizes, as well as by controlling the compatibility of immiscible polymers. They can also be used to improve the processability of the products.

Polymer blends of the type contemplated by the invention described herein have a wide variety of use. For example, since the blends have both hydrophobic and hydrophilic aspects, they can be used for the separation of materials exhibiting a hydrophobic or a hydrophilic nature. In addition, in the case of blends prepared from ionic surfactants, the polymers have a demonstrated ability to conduct electricity, making them useful in applications where electrical conductivity is desirable or necessary. Furthermore, in view of the porosity of the polymers, they may be used as high-efficiency filters. Beyond such specialized uses, however, the polymers may be employed in general purpose applications for which polymers have ordinarily been used by industry.

The following examples, while not intended to be limiting in nature, are illustrative of the invention.

EXAMPLE 1

Cetyl trimethyl ammonium bromide, CTAB, a cationic surfactant supplied by Sigma Chemical Company, is combined with 2-pentanol, a short-chain alcohol employed as a consolvent, and a microemulsion containing both a hydrophilic monomer, acrylamide, and a hydrophobic monomer, styrene, is prepared in the following manner.

1.2 grams of CTAB are added to 2.5 grams of 2-pentanol, and 2.1 grams of water are added. The combination is mixed using a vortex mixer, followed by ultrasonicator. 2.1 grams of acrylamide are then added, followed by 2.1 grams of inhibitor-free, purified styrene. The solution is mixed using a vortex mixer for from 2 to 3 minutes, and then ultrasonicated for about 10 minutes. A single phase, clear microemulsion is obtained at room temperature. The microemulsion is allowed to equilibrate at the polymerization temperature, 70° C., for 1 day. The microemulsion is also single phase at 70° C. On a weight basis, based on the weight of the microemulsion, the microemulsion thus prepared contains 12% CTAB, 25% 2-pentanol, 21% water, 21% acrylamide, and 21% styrene.

To initiate the polymerization, 0.042 gram of an oil soluble initiator, AIBN, is added to the microemulsion and thoroughly mixed at 70° C. Polymerization of the microemulsion then takes place in a nitrogen environment at 70° C. for about 24 hours. The polymerized sample is dried under vacuum, to produce a homogeneous, porous solid.

EXAMPLE 2

In a second experiment, CTAB is again selected as the surfactant, and 1-butanol as the cosolvent. A microemulsion containing both the hydrophilic monomer, acrylamide, and a mixture of hydrophilic monomers, styrene together with n-butyl acrylate, is prepared in the following manner.

1.5 grams of CTAB are mixed with 1.0 gram of 1-butanol, and 1.5 grams of water are added. The mixture is stirred with a vortex mixture, followed by ultrasonication. 2.0 grams of acrylamide are then added, followed by 2.0 grams of styrene, and 2.0 grams of butyl acrylate. The solution is mixed using a vortex mixture for from about 2 to 3 minutes, and then ultrasonicated for 10 minutes at room temperature. A single phase, transparent microemulsion is obtained. The microemulsion is allowed to equilibrate at the polymerization temperature of 65° C., and is found to produce a single phase microemulsion. On a weight basis, based on the weight of the microemulsion, the microemulsion contains 15% CTAB, 10% 1-pentanol, 15% water, 20% acrylamide, 20% styrene, and 20% butylacrylate.

To initiate the polymerization, 0.022 grams of potassium persulfate, and 0.026 grams of the initiator, AIBN, are added to the microemulsion and mixed at 65° C. Polymerization of the microemulsion is performed as in Example 1, but for about 40 hours. The solid sample is again dried under vacuum to produce a highly dispersed blend of porous, solid polymer. The Example thus illustrates a polymer blend in which two hydrophobic monomers styrene and butylacrylate, and polymerized with a single hydrophilic monomer acrylamide.

EXAMPLE 3

In another experiment, a zwitterionic surfactant, $C_{18}DMB$, is combined with the cosolvent 2-butanol in amounts such that each constitutes about 10% on a weight basis, by weight of the microemulsion formed. 20% by weight of water is then added, followed by 25% by weight acrylamide, and finally 35% by weight n-butyl acrylate. Following equilibration at 50° C., a single phase microemulsion is formed. Approximately 1% by weight, based on the total weight of monomer present, of the initiator AIBN is then added, and the monomers are polymerized for from about 2 to 3 hours to produce the desired solid polymeric product.

EXAMPLE 4

In a further example, the zwitterionic surfactant $C_{18}DMB$ is again combined with the cosurfactant 2-butanol, each constituting 10% by weight of the weight of the microemulsion formed, and 20% by weight of water is thereafter added. 20% by weight of acrylamide is subsequently added, followed by 35% by weight of n-butyl acrylate. Finally, 5% by weight of 2-N, N'-methylene bisacrylamide, a hydrophilic comonomer is introduced.

Following equilibration at 60° C., a combination of initiators, AIBN and potassium persulfate is introduced, and the polymerization is allowed to proceed for about an hour at 60° C. The product obtained is a porous, uniformly dispersed blend of the three monomers.

EXAMPLE 5

In another example, the microemulsion is prepared according to the method of Example 1 so that it contains on a weight basis, based on the weight of the microemulsion, 14% of the surfactant sodium dodecyl sulfate (SDS) and 14% by weight of 2-pentanol. 24% of water is thereafter added. Monomers, that is, acrylamide, and styrene, each amounting to 24% by weight of the microemulsion are thereafter added in the order mentioned, and the mixture agitated by use of a vortex mixer and an ultrasonicator to form the desired microemulsion. Following equilibration, an AIBN initiator is added and the polymerization conducted at 60° C. in a procedure similar to that described in connection with Example 1. A solid, porous polymer is thus obtained.

EXAMPLE 6

In another example, 14% by weight, based on the weight of the microemulsion, of SDS is added to 20% by weight of 2-pentanol to form the surfactant system. The surfactant system is added to 22% by weight of water, and 22% by weight of acrylamide is introduced, followed by 20% by weight of styrene and finally, 2% of divinylbenzene, the latter being a cross-linking monomer.

The mixture is agitated to form the microemulsion, and equilibrated. Thereafter, the polymerization is carried out at 60° C. in the presence of both AIBN and potassium persulfate to produce a solid, porous polymer.

EXAMPLE 7

In another example, a surfactant system using 12% by weight of the microemulsion of Trycol DNP-8 is employed without a cosolvent. The microemulsion includes 38% by weight of water, 20% by weight of acrylamide, and 30% by weight of styrene. Following agitation as previously described at 25° C., two phases are formed, the microemulsion phase, and a second, clear phase, containing excess components of the reaction mixture. An AIBN initiator is added, along with potassium persulfate, to the microemulsion phase, and the polymerization is conducted at 60° C. while the microemulsion is gently agitated by shaking. A solid polymer is formed, which upon macro examination, i.e., without microscopic enlargement, appears to comprise a single phase, but which in fact includes two-phase microstructures.

EXAMPLE 8

In this experiment, a mixture of an anionic surfactant is combined with a nonionic surfactant, i.e., 12% by weight, based on the weight of the microemulsion, of SDS, in combination with 6% by weight of Neodol 91-2.5. 20% by weight of a cosolvent, 2-pentanol, is included, and 22% by weight of water is also added. Thereafter, 15% by weight of acrylamide and 25% by weight of styrene are introduced. Following agitation as described, a single phase microemulsion is obtained. After equilibration, and polymerization for about two to four hours at 65° C. in the presence of AIBN, a single phase, porous solid is obtained.

EXAMPLE 9

In still another experiment, 15% by weight of the microemulsion of Aerosol OT is added to 10% by weight of water, in the absence of a cosolvent. Thereafter, 15% by weight of acrylamide, 30% by weight of styrene, and 30% by weight of butyl acrylate are introduced. Agitation at room temperature produces a microemulsion phase, as well as a second, excess phase. Both AIBN and potassium persulfate are combined with the reaction mixture, and the monomers polymerized for about one to two hours at 60° C. with gentle agitation during the early stages of the polymerization. On a macroscopic scale, a single phase, solid polymer is again obtained which has a two-phase porous microstructure.

EXAMPLE 10

In another experiment, 20% by weight of the weight of the microemulsion of an anionic surfactant, AOT, is used without a cosolvent to form the microemulsion. The mixture contains 10% by weight of water, 5% by weight of acrylamide, 1% by weight of bisacrylamide, and 64% of butyl acrylate. A transparent microemulsion is formed by agitation as previously described, and after equilibration, the mixture is polymerized for about one hour at 65° C. by the addition of AIBN and potassium persulfate to produce a porous, solid polymeric product.

EXAMPLE 11

In this case, 20% by weight of the microemulsion of a nonionic surfactant Emsorb 6900 is added without a cosolvent. 35% by weight of water is introduced, as are 23% by weight of acrylamide, 2% by weight of bisacrylamide, and 20% by weight of methyl methacrylate. The microemulsion is formed as a transparent single phase. Both AIBN and potassium persulfate initiators are added, and polymerization is induced by heating the reaction mixture to 70° C. for less than about an hour. A solid polymeric product results from the procedure.

EXAMPLE 12

In this case, a microemulsion is formed from a mixture of a zwitterionic surfactant together with a nonionic surfactant. The experiment involves the addition of 10% by weight of the microemulsion of $C_{18}DMB$, together with 10% by weight of Emsorb 6900. 20% by weight of water is added, as are 20% by weight of acrylamide, 5% by weight of bisacrylamide, and 35% by weight of methyl methacrylate. After addition of AIBN and potassium persulfate initiators, the monomers present in the reaction mixture are polymerized for about an hour at 60° C. to form a porous solid product.

EXAMPLE 13

In this example, 15% by weight of the weight of the microemulsion of $C_{18}DMB$ is combined with 10% by weight of 2-pentanol, and 20% by weight of water. 20% by weight of acrylamide, 5% by weight of bisacrylamide, 22% by weight of styrene, and 3% by weight divinylbenzene are then added. Following agitation to form the microemulsion, equilibriation, and polymerization at 60° C. in the presence of AIBN and potassium persulfate, a solid polymeric product is obtained.

EXAMPLE 14

In a still further example, a microemulsion is formed by combining 20% by weight, based on the weight of the microemulsion, of Emsorb 6900, together with 35% by weight of water, 20% by weight of acrylamide, 5% by weight of bisacrylamide, 18% of styrene and 2% of divinylbenzene. Following agitation and equilibriation, the polymerization is initiated by introducing AIBN and potassium persulfate. The polymerization, conducted at 60° C., again produces a porous solid.

What is claimed is:

1. A process for preparing porous solid blends and composites of polymers containing at least two solid phases from microemulsions comprising the steps of:
   (1) forming a reaction mixture by combining components consisting of:
   water
   at least one emulsifier soluble in another component of said reaction mixture selected from the group consisting of alkyl benzene sulfonates, alcohol sulfates, fatty amide ether sulfates, alpha-olefin sulfates, paraffin alkane sulfonates, sulfonated fatty acids and esters, sulfosuccinates, phosphate esters, ligno-sulfonates, alkyl phenol ethoxylates, fatty alcohol ethoxylates, ethylene oxide-propylene oxide copolymers, fatty amine ethoxylates, fatty acid ethoxylates, alkanolamides, alkanol ethoxylates, sorbitan esters, primary alkylamines, quaternary ammonium salts, imidazolinium salts and betaines;
   at least one hydrophilic monomer soluble in water selected from the group consisting of acrylamide, methacrylic acid, acrylonitrile, vinyl methyl ether, N-vinyl pyrrolidone, 4-vinyl pyridine,3-methacrylamidopropyldimethylamine and N,N'-dimethylaminoethylmethacrylate; and
   at least one liquid hydrophobic monomer selected from the group consisting of styrene, divinylbenzene, vinyl toluene, methyl acrylate, methyl methacrylate, ethyl acrylate benzyl acrylate, benzyl methacrylate, butyl acrylate, vinyl acetate, vinyl chloride, n-vinyl carbazole and ethyl vinyl ether;
(2) agitating said mixture until the formation of a microemulsion has been achieved, and
(3) polymerizing said hydrophilic and hydrophobic monomers to produce water-insoluble, homopolymer-containing, porous solid blends and composites of polymers.

2. A process for preparing porous solid blends and composites of polymers containing at least two solid phases from microemulsions comprising the steps of:
(1) forming a reaction mixture by combining components consisting of:
water
at least one emulsifier soluble in another component of said reaction mixture selected from the group consisting of alkyl benzene sulfonates, alcohol sulfates, fatty amide ether sulfates, alpha-olefin sulfates, paraffin alkane sulfonates, sulfonated fatty acids and esters, sulfosuccinates, phosphate esters, lignosulfonates, alkyl phenol ethoxylates, fatty alcohol ethoxylates, ethylene oxide-propylene oxide copolymers, fatty amine ethoxylates, fatty acid ethoxylates, alkanolamides, alkanol ethoxylates, sorbitan esters, primary alkylamines, quarternary ammonium salts, imidazolinium salts and betaines;
at least one hydrophilic monomer soluble in water selected from the group consisting of acrylamide, methacrylic acid, acrylonitrile, vinyl methyl ether, N-vinyl pyrrolidone, 4-vinyl pyridine, 3-methacrylamidopropyldimethylamine and N,N'-dimethylaminoethylmethacrylate;
at least one liquid hydrophobic monomer selected from the group consisting of styrene, divinylbenzene, vinyl toluene, methyl methacrylate, ethyl acrylate, benzyl acrylate, benzyl methacrylate, butyl acrylate, vinyl acetate, vinyl chloride, n-vinyl carbazole and ethyl vinyl ether;
and at least one cosolvent;
(2) agitating said mixture until the formation of a microemulsion has been achieved, and
(3) polymerizing said hydrophilic and hydrophobic monomers to produce water-insoluble, homopolymer-containing, porous solid blends and composites of polymers.

3. A process according to claim 2 in which said cosolvents are selected from the group of short chain amines, short chain ketones and short chain alcohols having from about 3 to about 8 carbon atoms.

4. A process according to claim 1 in which said microemulsion is a member selected from the group consisting of an oil-in-water microemulsion, a water-in-oil microemulsion, and a microemulsion having a bicontinuous structure.

5. A process according to claim 1 in which the microemulsion comprises domains of monomer molecules having diameters of from about 0.01 microns to about 0.1 microns.

6. A process according to claim 1 in which the microemulsion is in equilibrium with a second liquid phase.

7. A process according to claim 1 in which said polymerization is carried out by introducing into said reaction mixture at least one polymerization initiator, heating said mixture until said polymerization has taken place, and thereafter separating said blend from said mixture.

8. A process according to claim 1 in which said polymerization is carried out by introducing into said reaction mixture an oil soluble polymerization initiator, and a water soluble polymerization initiator, heating said mixture until said polymerization has taken place, and thereafter, separating said blend from said mixture.

* * * * *

UNITED STATES PATENT AND TRADEMARK OFFICE
CERTIFICATE OF CORRECTION

PATENT NO. :   5,238,992
DATED      :   August 24, 1993
INVENTOR(S):   SYED QUTUBUDDIN It is certified that error appears in the above-indentified patent and that said Letters Patent is hereby corrected as shown below:

TITLE PAGE, ITEM [75]:

PLEASE CORRECT SPELLING OF INVENTOR'S NAME AS FOLLOWS:

PRESENTLY INCORRECTLY SPELLED "OUTUBUDDIN";

CORRECT SPELLING SHOULD BE --QUTUBUDDIN--.

Signed and Sealed this

Fourth Day of October, 1994

Attest:

BRUCE LEHMAN

*Attesting Officer*            *Commissioner of Patents and Trademarks*